US006354632B1

United States Patent
Jung et al.

(10) Patent No.: US 6,354,632 B1
(45) Date of Patent: *Mar. 12, 2002

(54) EXHAUST DECOUPLER SYSTEM

(75) Inventors: Eun Sung Jung; Dae Hyun Kim, both of Kyunggi-do (KR)

(73) Assignee: SJM Company Ltd., Kyunggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/532,003

(22) Filed: Mar. 21, 2000

(30) Foreign Application Priority Data

May 24, 1999 (KR) .............................................. 99-8874

(51) Int. Cl.$^7$ ................................................ F16L 11/12
(52) U.S. Cl. ........................... 285/49; 285/47; 285/226; 285/299
(58) Field of Search ........................... 285/47, 49, 226, 285/299, 300, 301

(56) References Cited

U.S. PATENT DOCUMENTS

| 4,659,117 A | * | 4/1987 | Holzhausen et al. ........... 285/49 |
| 4,911,482 A | * | 3/1990 | Doat ........................... 285/226 |
| 5,437,479 A | * | 8/1995 | Hartling et al. ................ 285/49 |
| 5,967,193 A | * | 10/1999 | Nagai et al. .................... 285/49 |
| 6,151,893 A | * | 11/2000 | Watanabe et al. ............ 285/226 |
| 6,164,703 A | * | 12/2000 | Kim ............................. 285/49 |

FOREIGN PATENT DOCUMENTS

| EP | 0 519 636 A1 | 6/1992 |
| EP | 0 575 727 A1 | 4/1993 |

* cited by examiner

*Primary Examiner*—Lynne H. Browne
*Assistant Examiner*—Aaron Dunwoody

(57) ABSTRACT

An exhaust decoupler system for motor vehicles includes: a sleeve through which exhaust gas may pass from the engine; a couple of retainer members oppositely positioned from the exhaust pipe and engine, one member engaged with the outer side of the sleeve, at which end the rims are circumferentially bent; bellows between the rims of the inner retainer members, for absorbing the bending and expansion to maintain the exhaust gas to be airtight; outer retainer members located externally the inner retainer members, both ends engaged with the inner retainer members, inner side to be opened toward the center; a guide ring member for dividing the inner retainer members and outer retainer members to symmetrically form first pockets and second pockets, and for surrounding the bellows; and an inner buffering member and an outer buffering member in the form of loop to be filled within in the first pockets and the second pockets. The bending displacement is efficiently absorbed to minimally effect the engine by oppositely sliding the guide ring member in the bending displacement direction between the inner and outer buffering members. Moreover, the system enables the sliding length between the inner and outer buffering members to be shortened, thereby reducing the abrasion and friction noise, so that the fatigue life of the overall exhaust pipe and the durability of the product can be increased.

4 Claims, 4 Drawing Sheets

PRIOR ART

EXHAUST DECOUPLER SYSTEM

BACKGROUND OF THE INVENTION

This invention relates to an exhaust decoupler system for motor vehicles, and more particularly, to the system for effectively absorbing the noise incurred by the friction and wear of a guide ring in bending displacement between the engine and exhaust system during travelling of a vehicle in order to minimize the effect of displacements to the engine on the exhaust system and for prolonging the fatigue life of vehicle.

PRIOR ART

Recent vehicles preferably adopt the larger engines, which increase the engine roll vibration in starting and braking the engines or shifting gears. Further, the vibrations of the exhaust pipe may occur depending on the road conditions.

Conventional engines of the vehicle are connected with the exhaust pipe employing a muffler for exhausting the exhaust gas from the vehicle. For connection, a decoupler is installed for absorbing and buffering the vibration displacement, impact load or heat deformation. The decoupler on this location should be strong and compact for self-supporting the exhaust pipe with minimum number of lightweight hanger mount.

A number of attempts have been made in the prior art to design an effective decoupler. One attempt to solve the problems of the prior art is demonstrated by GB2,277,969A in which a center point of the bending displacement is determined to absorb the bending displacement.

In the prior art (FIG. 7), both sleeves 5 and 6 are interposed with a predetermined space. Sleeve 6 is separated by the projection 7 to form two pockets on both sides, for locating respective buffering members 8 in the pockets.

Meanwhile, a bellows 9 is externally positioned between the sleeves 5 and 6 adjacent to the buffering member 8. A center displacement C is determined in the middle of the position at which the sleeves 5 and 6 are interposed, which is curved and expansible, for enabling the buffering member 8 and the bellows 9 to absorb the expansion displacement in the longitudinal direction from impact occurred in the travelling or engine vibration, and bending displacement at which the central axis degrees are intercrossed around the decoupler.

The bellows 9 is externally exposed and may be easily damaged by corrosion or unexpected object in travelling.

Located in the middle of the buffering member 8 is the center displacement C for absorbing the buffering and bending. In case that the impact of a sudden large displacement is applied, inner sleeve 6 connected to the exhaust pipe is directly exposed to the exhaust gas at high temperature, thereby shortening the fatigue life due to the repetitive impact load. Moreover, the bending of the bellows 9 is achieved by forced moment bending, not angular motion, resulting in the short lifetime.

In order to overcome these disadvantages, a method for increasing the number of creases in the bellows 9 may be considered. However, this method causes an entire length to be increased and the quality of material should be superior as well. This also results in high costs in producing the apparatus.

Because the buffering member 8 cannot efficiently absorb the displacement in the bending direction, it is not suitable for the function of absorbing the large bending. As a result, the function of the decoupler D becomes low and the scope to be applied is very restricted.

In order to overcome the prior disadvantages, Korean Utility Model Application 98-1569 by this applicant has suggested a guide ring to be slided in the direction of the bending displacement between the buffering members and bent in greater displacement angle. However, Korean UM application 98-1569 does not show to control the moving length of the guide ring which slides between the outer mesh ring and the inner mesh ring during the large bending motion. It has another disadvantages that the wearability of the guide ring between the wire mesh rings increases and the frictional noise is incurred.

SUMMARY OF THE INVENTION

In view of the foregoing, it is a primary object of the present invention to provide an exhaust decoupler system which is capable of absorbing the frictional noise and prevents the guide ring from wearing.

It is another object of the present invention to provide an exhaust decoupler system which can improve the passenger's comfort and lengthens the lifetime of the device.

It is a further object of the invention to provide a compact exhaust decoupler system for absorbing the displacement at a large bending angle, which is installed adjacent to the engine at any types of automobiles.

The exhaust decoupler system of the present invention includes: a sleeve 10 through which exhaust gas may pass from the engine; a couple of retainer members 20 and 21 oppositely positioned from the exhaust pipe and engine, one member engaged with the outer side of the sleeve 10, at which end the rims 20a and 21a are circumferentially bent; bellows 30 between the rims 20a and 21a of the inner retainer members 20 and 21, for absorbing the bending and expansion to maintain the exhaust gas to be airtight; outer retainer members 40 and 41 located externally the inner retainer members 20 and 21, both ends engaged with the inner retainer members 20 and 21, inner side to be opened toward the center; a guide ring member 50 for dividing the inner retainer members 20 and 21 and outer retainer members 40 and 41 to symmetrically form first pockets 51 and 52 and second pockets 53 and 54, and for surrounding the bellows 30; and an inner buffering member 60 and an outer buffering member 61 in a shape of ring to be filled within in the first pockets 51 and 52 and the second pockets 53 and 54.

Between the inner and the outer retainer buffering members 60 and 61 the guide ring member 50 is symmetrically slid in the direction of the bending displacement, to shorten the displacement length of the guide ring member 50.

Accordingly, the present invention can effectively absorb a large degree of bending displacement to minimize the effects to the engine, and decrease the frictional noise and wear of the guide ring member 50 slidable between the inner and outer buffering members 60 and 61, thereby increasing the fatigue life of the exhaust pipe and the durability.

The foregoing and other objects and features of the present invention will become more fully apparent to persons of ordinary skill in the art from the following description and appended claims, taken in conjunction with the accompanying drawings.

BRIEF DESCRIPTION OF THE DRAWINGS

The present invention will be described with the accompanying drawings in which:

FIG. 1 shows a first embodiment for a sleeve 10 on one side; FIG. 2 shows a second embodiment for the sleeve 10 on both sides; and FIGS. 3 and 4 show still another embodiments for angle control means to control the sliding displacement of the guide ring member 50 against the embodiments of FIGS. 1 and 2.

DETAILED DESCRIPTION OF THE PREFERRED EMBODIMENTS

Figure 1:
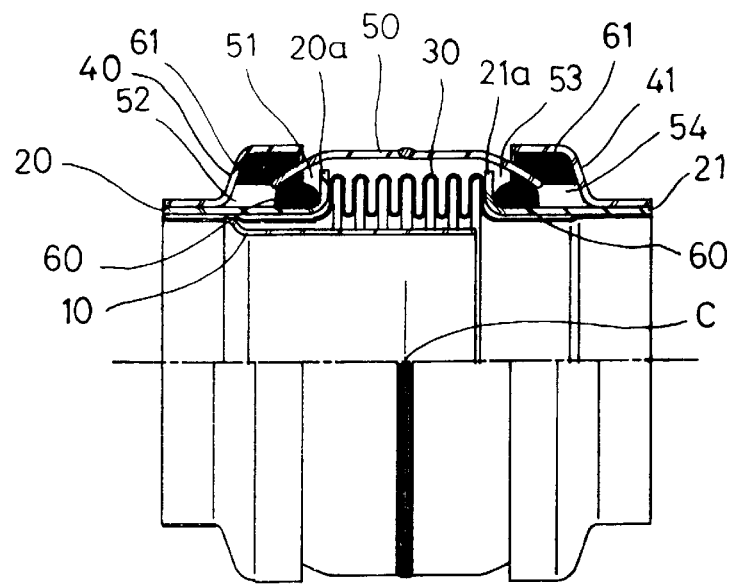
FIGS. 1 to 4 are the sectional views of the preferred embodiments of the present invention, each of which shows the inner and outer buffering members 60 and 61 oppositely formed and the guide ring member to be axially slid in bending displacement.

It will be readily understood that the components and steps of the present invention, as generally described and illustrated in the Figures herein and accompanying text, could be arranged and designed in a wide variety of different configurations while still utilizing the inventive concept. Thus, the following more detailed description of the preferred embodiments of the present invention, as represented in the drawings and accompanying text, is not intended to limit the scope of the invention, as claimed, but it is merely representative of the presently preferred embodiments of the invention.

Engines are, in general, supported by a number of installations, employing a muffler in the direction of the decoupler of the exhaust pipe, and connected to the exhaust pipe by the decoupler.

Referring to FIG. 1, the inner retainer members 20 and 21 and the outer retainer members 40 and 41 are interposed by welding or pressing external to the cylindrical sleeve 10 through which the exhaust gas from the engine passes. The ends of the inner retainer members 20 and 21 are circumferentially bent against the rims 20a and 21a in the flange. The opposing ends of the outer retainer members 40 and 41 are outwardly elongated.

One end of the sleeve 10 of which interior is hollow is connected to the engine and the other end is connected to the exhaust pipe.

A couple of the inner retainer members 20 and 21, both in separate, are oppositely located toward the engine and exhaust pipe. One member is engaged with the external side of the sleeve 10, and the rims 20a and 21a are circumferentially bent at the end.

The rims 20a and 21a of the inner retainer members 20 and 21 keep the exhaust gas to be airtight and support the bellows 30.

The bellows 30 absorbs the displacement in the expansion direction and bending direction, and is longitudinally installed between the inner retainer members 20 and 21 in order to prevent the exhaust gas from leaking out from the sleeve 10 and the inner retainer members 20 and 21.

The bellows 30, with a repeatedly corrugated shape, can readily accommodate both axial displacement and bending displacement, and recovers the original shape when the external forces causing displacement are removed.

As shown in FIGS. 1 to 4, the bellows 30 is attached to one side along the inner retainer members 20 and 21. In FIG. 1, one end of the bellows is installed on outer diameter of the sleeve 10 and the other end is attached to the inner diameter of the inner retainer member 21 by wending or pressing. The fixing means may include all such means for fixing.

Outwardly from the inner retainer members 20 and 21 are located the outer retainer members 40 and 41.

The outer retainer members 40 and 41 are in a divergent shape, of which ends having small diameter are engaged with the inner retainer members 20 and 21. The ends having larger diameter are inwardly open.

Between the inner retainer members 20 and 21 and the outer retainer members 40 and 41, a guide ring member 50 is installed to oppositely form the first pockets 51 and 52 and the second pockets 53 and 54.

Inside of the first pockets 51 and 52 and the second pockets 53 and 54 divided by the guide ring member 50 are located the inner and outer buffering members 60 and 61.

Figure 2:
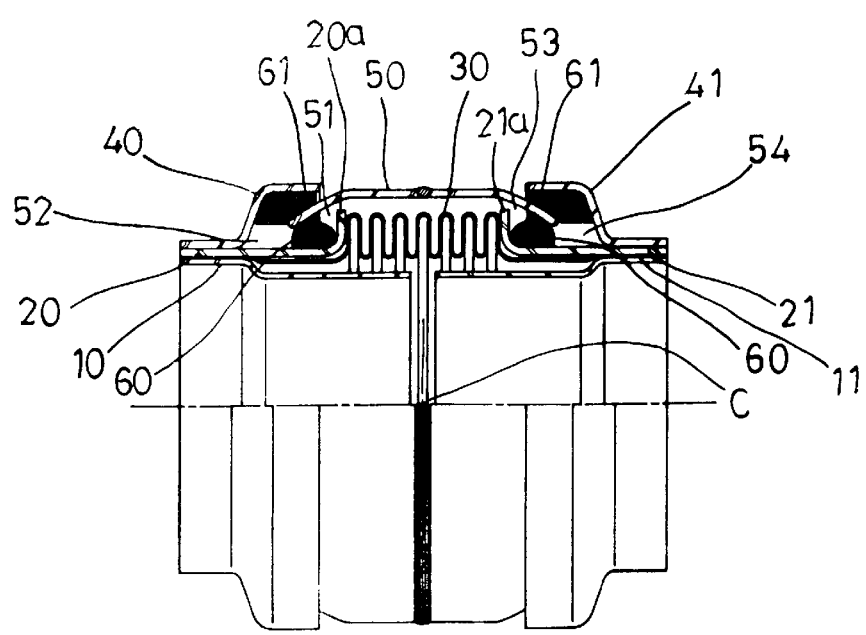

The sleeve 10 has a hollow inside and is configured to pass through the exhaust gas, protecting the bellows 30, and prevents the noise from leaking of the exhaust gas. Different from the configuration that one sleeve is installed toward the engine (FIGS. 1 and 3), the other sleeve 11 may be oppositely installed toward the exhaust pipe (FIGS. 2 and 4).

The guide ring member 50 may be elongated in a body or two members may be connected by butt welding as shown in the drawings. For assembly, welding to an additional member is preferred.

Filled in the first pockets 51 and 52 and the second pockets 53 and 54 are inner and outer buffering members 60 for absorbing the expansion displacement and bending displacement in the longitudinal direction, impact occurred from the road vibration in travelling or engine vibration.

The inner and outer buffering members 60 and 61 are made in a ring-shape with regard to the first pockets 51 and 52 and the second pockets 53 and 54. It is desirable to use the elastic material for the buffering members in order to recover the original shape when the stress is released, preferably, the material made of compressed thin wiring net in a ring shape to have perpetual resilience.

Because the contact area of the guide ring members 50 receives repetitive frictions, it is preferred to coat on the contact area of the inner and outer buffering members 60 and 61 with surface treatment material such as graphite. The exhaust pipe is capable of self-supporting by this configuration.

Figure 5:
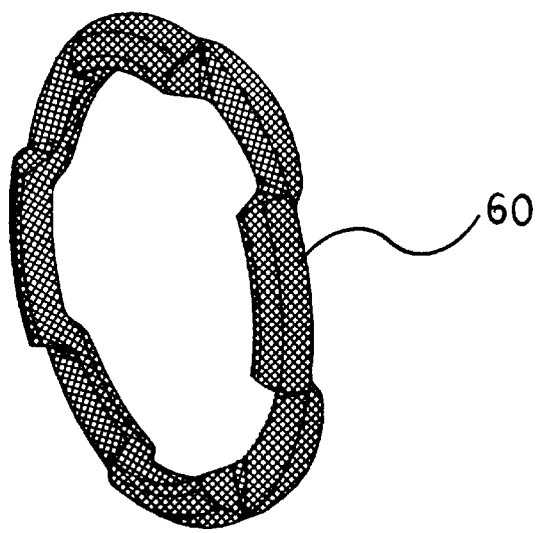
FIGS. 5 and 6 are the perspective views showing the preferred embodiments of the inner and buffering members 60 and 61.
Figure 6:
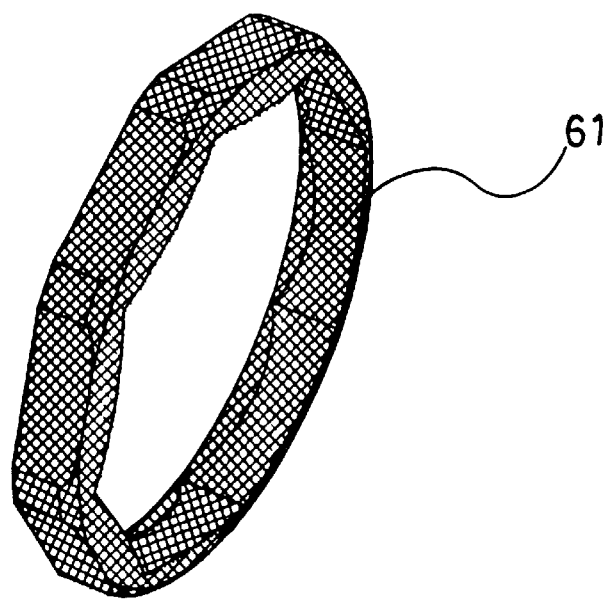
Figure 7:
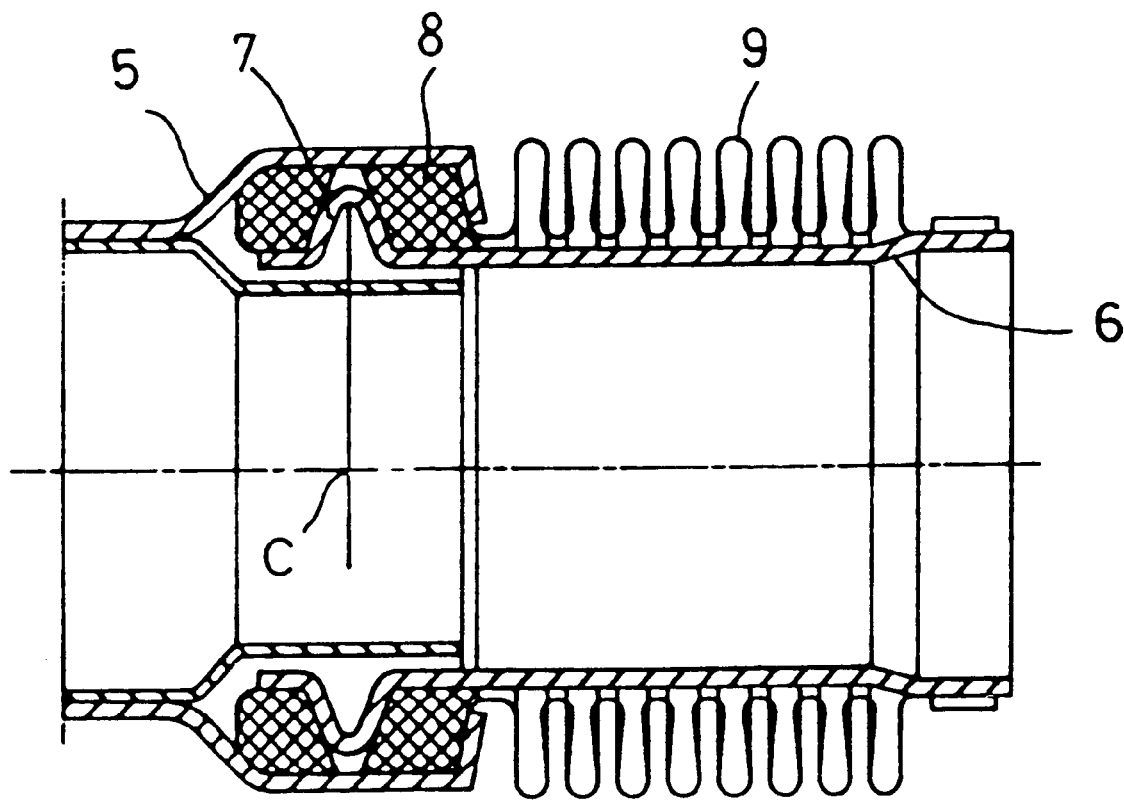
FIG. 7 a sectional view of the conventional exhaust decoupler system.

The inner and outer buffering members 60 and 61 is a shape of a smooth ring or other rugged or unjustified ring (FIGS. 5 and 6).

The inner buffering member 60 in FIG. 5 is an inner wire mesh ring positioned inside the guide ring member 50, to perform the expansion absorbing function against the compressed transformation in axial direction.

The outer buffering member 61 in FIG. 6 is an inner wire mesh ring positioned outside the guide ring member 50, to improve the buffering capability for bending transformation with the outer retainer members 40 and 41 outer positioned from the guide ring member 50.

The preferred embodiments of the present invention in FIGS. 1 and 2 show the end of the guide ring member 50 having a slack curve and being bent between the inner and outer buffering members 60 and 61.

This configuration is suitable for large bending absorption because the sliding displacement of the guide ring member 50 is not limited.

The extinct characteristics of the present invention lie in that the inner and outer buffering members 60 and 61 are oppositely located in the first pockets 51 and 52 and the second pockets 53 and 54 divided by the guide ring member 50 between the outer retainer members 40 and 41 and the inner retainer members 20 and 21, and the displacement of the guide ring member 50 is distributed to both locations, thereby improving the bending displacement capability, and the frictional noise and wear due to the short sliding length of the guide ring member 50 are reduced as well.

For example, the conventional method for the device with approximately 8° bending degree is carried out by sliding the guide ring member 50 for the bent length of 8° degree.

According to the present invention, however, the displacement is divided by both for 4° to absorb the displacement.

Figure 3:
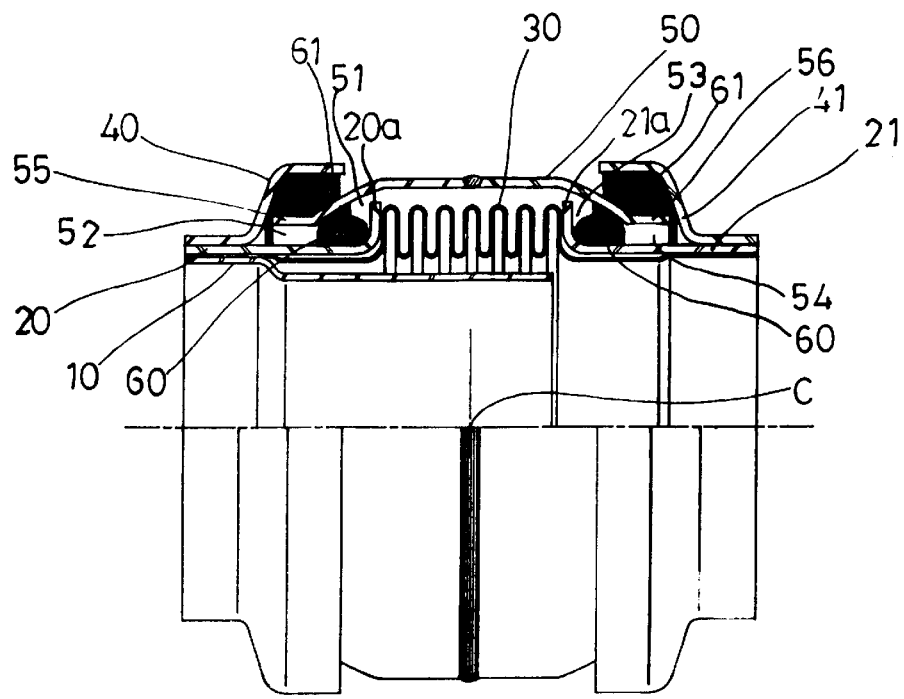
Figure 4:
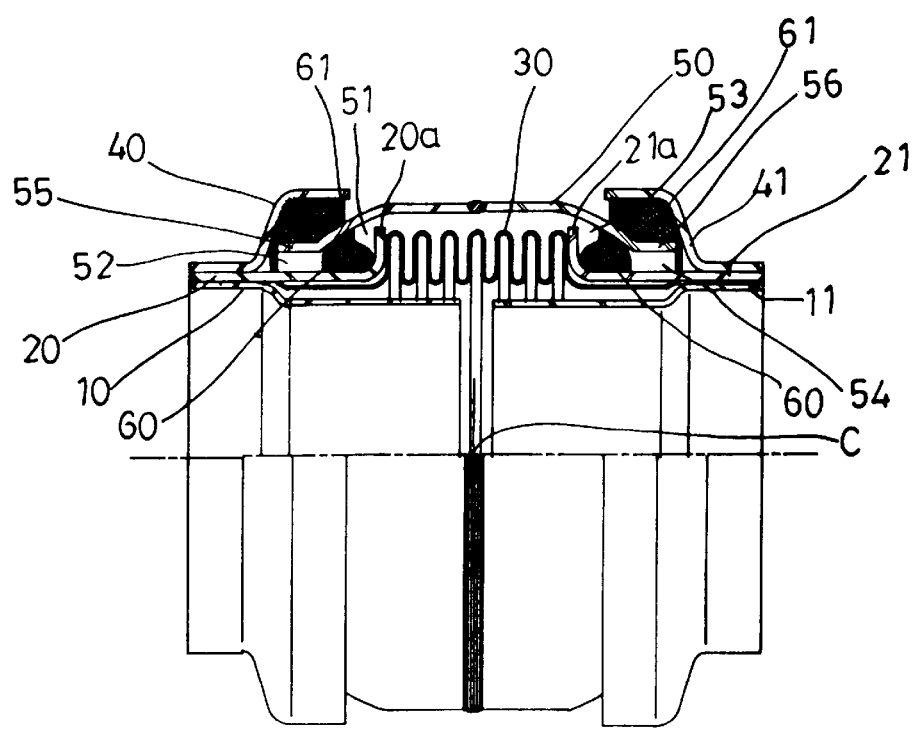

Referring to FIGS. 3 and 4, an end of the guide ring member 50 has a bending angle control pieces 55 and 56 in a cylindrical shape to be contact with the outer buffering member 61. When the stress or engine motion is applied to this area, the bending angle control pieces 55 and 56 function to control a predetermined angle to absorb the displacement.

In this configuration, the bending angle control pieces 55 and 56 act to compress one outer buffering member 61 and limit the displacement subject to the bending operation. The sliding displacement angle of the guide ring member 50 is controlled and limited in this configuration, and therefore, it is suitable for the relatively low bending absorbing capability.

According to the present invention, the bending displacement is efficiently absorbed to minimally effect the engine by oppositely sliding the guide ring member in the bending displacement direction between the inner and outer buffering members 60 and 61. Moreover, the present invention enables the sliding length between the inner and outer buffering members 60 and 61 to be shortened, thereby reducing the wear and frictional noise, so that the fatigue life of the overall exhaust pipe and the durability of the product can be increased.

What is claimed is:

1. An exhaust decoupler system for motor vehicles, comprising:
   - a cylindrical sleeve for exhaust gas from an engine to pass through;
   - a couple of inner retainer members oppositely positioned toward the engine and an exhaust pipe, one member engaged with the outer side of the sleeve, at which end rims of the inner retainer members are circumferentially bent to extend radially from the axis of the pipe;
   - bellows fixed between the rims of the inner retainer members, for absorbing the bending and expansion of the system so as to maintain the system airtight;
   - a couple of outer retainer members positioned outside of the inner retainer members, both ends of the outer retainer members engaged with the inner retainer members with an inner side to be opened toward the axis of the pipe;
   - a guide ring member for dividing the inner retainer members and outer retainer members to symmetrically form first pockets and second pockets, and for surrounding the bellows; and
   - an inner buffering member and an outer buffering member shaped in a form of loop to be filled within in the first pockets and the second pockets.

2. The exhaust decoupler system for motor vehicles, comprising:
   - a cylindrical sleeve for exhaust gas from an engine to pass through;
   - a couple of inner retainer members oppositely positioned toward the engine and an exhaust pipe, one member engaged with the outer side of the sleeve, at which end rims of the inner retainer members are circumferentially bent to extend radially from the axis of the pipe;
   - bellows fixed between the rims of the inner retainer members, for absorbing the bending and expansion of the system so as to maintain the system airtight;
   - a couple of outer retainer members positioned outside of the inner retainer members, both ends of the outer retainer members engaged with the inner retainer members with an inner side to be opened toward the axis of the pipe;
   - a guide ring member for dividing the inner retainer members and outer retainer members to symmetrically form first pockets and second pockets, and for surrounding the bellows;
   - an inner buffering member and an outer buffering member shaped in a form of loop to be filled within in the first pockets and the second pockets; and
   - bending angle control pieces located at the end of said guide ring member.

3. The exhaust decoupler system as claimed in claim 1, wherein said sleeve is installed on one end of the engine and one end of the exhaust pipe so as to connect the engine and the exhaust pipe.

4. The exhaust decoupler system as claimed in claim 2, wherein said sleeve is installed on one end of the engine and one end of the exhaust pipe so as to connect the engine and the exhaust pipe.

* * * * *